(12) United States Patent
Klim et al.

(10) Patent No.: US 11,447,157 B2
(45) Date of Patent: Sep. 20, 2022

(54) PASSIVE LATERAL STABILITY FOR A MAGLEV TYPE VEHICLE

(71) Applicants: SAFRAN LANDING SYSTEMS, Velizy-Villacoublay (FR); SAFRAN LANDING SYSTEMS CANADA INC., Ajax (CA)

(72) Inventors: Graeme Peter Arthur Klim, Vélizy-Villacoublay (FR); Justin Guang Yuang Cheng, Waterloo (CA); Andrew Michael Ellis, Guelph (CA)

(73) Assignees: SAFRAN LANDING SYSTEMS, Velizy-Villacoublay (FR); SAFRAN LANDING SYSTEMS CANADA INC., Ajax (CA)

(*) Notice: Subject to any disclaimer, the term of this patent is extended or adjusted under 35 U.S.C. 154(b) by 323 days.

(21) Appl. No.: 16/868,436

(22) Filed: May 6, 2020

(65) Prior Publication Data

US 2021/0347390 A1 Nov. 11, 2021

(51) Int. Cl.
*B60L 13/08* (2006.01)
*B61B 13/08* (2006.01)
*B60L 13/04* (2006.01)

(52) U.S. Cl.
CPC .............. *B61B 13/08* (2013.01); *B60L 13/04* (2013.01)

(58) Field of Classification Search
CPC ........... B61B 13/08; B60L 13/04; B60L 13/08
See application file for complete search history.

(56) References Cited

U.S. PATENT DOCUMENTS

| | | | |
|---|---|---|---|
| 3,470,828 A | 10/1969 | Powell, Jr. et al. | |
| 3,643,601 A | * 2/1972 | Taylor | B62D 1/265 104/119 |
| 6,101,952 A | 8/2000 | Thornton et al. | |

(Continued)

FOREIGN PATENT DOCUMENTS

| CN | 106476832 B | 12/2018 |
|---|---|---|
| DE | 2520289 A1 | 11/1976 |

(Continued)

OTHER PUBLICATIONS

International Search Report dated Jul. 22, 2021, issued in corresponding International Application No. PCT/CA2021/050606, filed Apr. 30, 2021, 4 pages.

(Continued)

*Primary Examiner* — Mark T Le
(74) *Attorney, Agent, or Firm* — Christensen O'Connor Johnson Kindness PLLC

(57) ABSTRACT

A passive lateral stability system maintains the position of a vehicle relative to a guideway. The system includes first and second guide assemblies that urge the vehicle away from first and second electrically conductive guide walls, respectively. The first guide assembly includes a wheel configured to reciprocate toward and away from the first guide wall. A biasing element bias biases the wheel toward the first guide wall. The system further includes a magnetic element associated with the wheel, wherein movement of the magnetic element relative to the first guide wall produces a magnetic force that biases the wheel away from the first guide wall. A second guide assembly is mounted to the vehicle and urges the vehicle away from the second guide wall.

14 Claims, 10 Drawing Sheets

(56) References Cited

U.S. PATENT DOCUMENTS

| | | | |
|---|---|---|---|
| 6,237,504 B1 * | 5/2001 | Tanahashi | B62D 1/265 |
| | | | 104/243 |
| 2003/0005851 A1 | 1/2003 | Post | |
| 2007/0095245 A1 * | 5/2007 | Li | B60L 13/04 |
| | | | 104/284 |
| 2010/0043665 A1 * | 2/2010 | Brigham | B61B 15/00 |
| | | | 105/215.1 |
| 2011/0277659 A1 * | 11/2011 | Lee | B60L 13/04 |
| | | | 310/154.01 |
| 2012/0097065 A1 | 4/2012 | Maeyama et al. | |
| 2012/0189409 A1 | 7/2012 | Toebes et al. | |
| 2018/0312245 A1 | 11/2018 | Klim et al. | |

FOREIGN PATENT DOCUMENTS

| | | |
|---|---|---|
| RU | 2683122 C1 | 3/2019 |
| WO | 03002370 A1 | 1/2003 |
| WO | 2015075995 A1 | 5/2015 |
| WO | 2018045470 A1 | 3/2018 |
| WO | 2019037691 A1 | 2/2019 |
| WO | 2019090118 A1 | 5/2019 |
| WO | 2019199199 A1 | 10/2019 |

OTHER PUBLICATIONS

Written Opinion dated Jul. 22, 2021, issued in corresponding International Application No. PCT/CA2021/050606, filed Apr. 30, 2021, 5 pages.

* cited by examiner

PASSIVE LATERAL STABILITY FOR A MAGLEV TYPE VEHICLE

BACKGROUND

Magnetically levitated ("maglev") transportation systems, such as a Hyperloop vehicle, provide the potential to move passengers and cargo at faster speeds and with improved efficiency compared to currently utilized modes of transportation. These systems employ vehicles that include one or more pressurized capsules to carry passengers and/or cargo through evacuated, i.e., low pressure, tubes. When traveling at high speeds, the vehicles are levitated by magnetic fields, compressed air, or other suitable means. By reducing/eliminating the high-speed air resistance and the friction inherent in the wheels of known vehicles, maglev systems are able to provide greater travel speeds and improved efficiency.

When traveling at low speeds or stopped, the vehicles do not levitate, but are instead supported by a support system that includes a plurality of independently controlled landing gear assemblies. Like aircraft landing gear, the maglev support systems reciprocate between an extended (deployed) position and retracted (stowed) position by extending and retracting the individual landing gear assemblies. When the vehicles are levitated, the support system is retracted, and the wheels of the landing gear assemblies do not contact the ground. When the vehicles are traveling at low speeds or stopped, the support system is extended so that the wheels of the landing gear assemblies contact a ground surface to support the vehicles. An example of an extendable and retractable landing gear assembly suitable for use as part of a wheeled support system for a maglev vehicle is disclosed in U.S. Patent Application Publication 2018/0312245 ("Klim et al."), filed Apr. 26, 2017, and currently assigned to Safran Landing Systems Canada Inc., the disclosure of which is expressly incorporated herein.

Within a high speed transportation system that consists of a passively levitated vehicle travelling along a guideway, there is a need to reliably stabilize the high speed vehicle throughout the range of transportation speeds. The demands for the stability of such a vehicle change with the speed of the vehicle. At high speeds, stabilization equipment will experience higher dynamic loads that can result in greater stresses and fatigue. The vehicle may also operate in regimes in which wheel-based stabilization is not suitable. At low speeds the stabilization of the vehicle might not be able to rely on the same operating principles as at high speeds. For example the magnetic forces induced by magnetic arrays on the vehicle moving past a stationary conductor along the guide track are proportional to the speed of the vehicle and the distance between the magnet and the conductor. Consequently, such a system can be used efficiently at high speeds but not low speeds.

A need exists for developing a passive stabilization system that operates reliable and efficiently throughout the entire range of transport speeds for such a vehicle.

SUMMARY

The subject matter disclosed herein provides a passive lateral stability system for a maglev-type vehicle. In some embodiments, the system includes first and second guide assemblies that interact with the guide walls to maintain the vehicle at predetermined position. As the vehicle moves toward the first guide wall, the first guide assembly generates a force that urges the vehicle away from the first guide wall. Similarly, as the vehicle moves toward the second guide wall, the second guide assembly generates a force that urges the vehicle away from the second guide wall. The forces are generated by biasing, e.g., "spring," elements when the vehicle is traveling at low speed and by the magnetic elements when the vehicle is traveling at higher speeds.

A first representative embodiment of a passive lateral stability system according to aspects of the present disclosure maintains a position of a vehicle relative to first and second electrically conductive guide walls. The system includes a first guide assembly mounted to the vehicle and urging the vehicle away from the first guide wall. The first guide assembly includes a first wheel and a first mount coupled to the vehicle, wherein the first wheel is rotatably coupled to the first mount about a first axis. The first mount is configured to reciprocate the first wheel toward the first guide wall and away from the first guide wall. A first biasing element is configured to bias the first wheel toward the first guide wall. A first magnetic element is associated with the first wheel, wherein movement of the first magnetic element relative to the first guide wall produces a force that biases the first wheel away from the first guide wall. The system further includes a second guide assembly mounted to the vehicle and urging the vehicle away from the second guide wall.

In any embodiment, the second guide assembly comprises a second wheel and a second mount coupled to the vehicle, wherein the second wheel is rotatably coupled to the second mount about a second axis. The second mount is configured to reciprocate the second wheel toward the second guide wall and away from the second guide wall. A second biasing element is configured to bias the second wheel toward the second guide wall, and a second magnetic element is associated with the second wheel, wherein movement of the second magnetic element relative to the second guide wall produces a force that biases the second wheel away from the second guide wall.

In any embodiment, the first mount comprises a link rotatably coupled at a first end to the vehicle, the first wheel being rotatably mounted to a second end of the link.

In any embodiment, a first end of the first biasing element is rotatably coupled to the vehicle, a second end of the first biasing element being rotatably coupled to the link.

In any embodiment, the first biasing element is an oleo-pneumatic strut rotatably coupled at a first end to the vehicle coupled at a first end to the vehicle and at a second end to the first mount.

In any embodiment, the first magnetic element comprises a magnetic array coupled to the first wheel.

In any embodiment, the magnetic array comprises a radial magnetic array extending around the first axis.

In any embodiment, the first mount comprises a four-bar linkage, comprising a first link rotatably coupled at a first end to the vehicle; a second link rotatably coupled at a first end to the vehicle; and a third link rotatably coupled at a first end to the first link and at a second end to the second link.

In any embodiment, the first magnetic element forms at least a part of the third link.

In any embodiment, the first magnetic element comprises a linear array of permanent magnets, such as a Halbach array.

In any embodiment, the third link remains parallel to the first guide wall as the first wheel reciprocates toward the first guide wall and away from the first guide wall.

In any embodiment, the first guide assembly further comprises a second wheel and a second mount coupled to the vehicle, wherein the second wheel is rotatably coupled to the second mount about a second axis. The second mount is configured to reciprocate the second wheel toward the first guide wall and away from the first guide wall. A second biasing element is configured to bias the second wheel toward the first guide wall. The first magnetic element is coupled to the first mount and the second mount.

In any embodiment, the first magnetic element is an elongate element, a first end of the elongate element being coupled to the first mount by a first attachment link, a second end of the elongate element being coupled to the second mount be a second attachment link.

In any embodiment, the first magnetic element comprises a linear Halbach array.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the present disclosure will become more readily appreciated as the same become better understood by reference to the following detailed description, when taken in conjunction with the accompanying drawings, wherein.

DETAILED DESCRIPTION

A passive lateral stability system is provided for a passively levitated vehicle traveling along a guideway with first and second guide walls. The lateral stability system includes first and second guide assemblies located on the vehicle that interact with the guide walls to maintain the vehicle at predetermined position, e.g., a "centered position," relative to the first and second guide walls. As the vehicle and, thus, the first guide assembly moves toward the first guide wall, the first guide assembly generates a force that urges the vehicle away from the first guide wall. Similarly, as the vehicle moves toward the second guide wall, the second guide assembly generates a force that urges the vehicle away from the second guide wall. The forces are generated by biasing, e.g., "spring," elements when the vehicle is traveling at low speed and by the magnetic elements when the vehicle is traveling at higher speeds.

Figure 1:
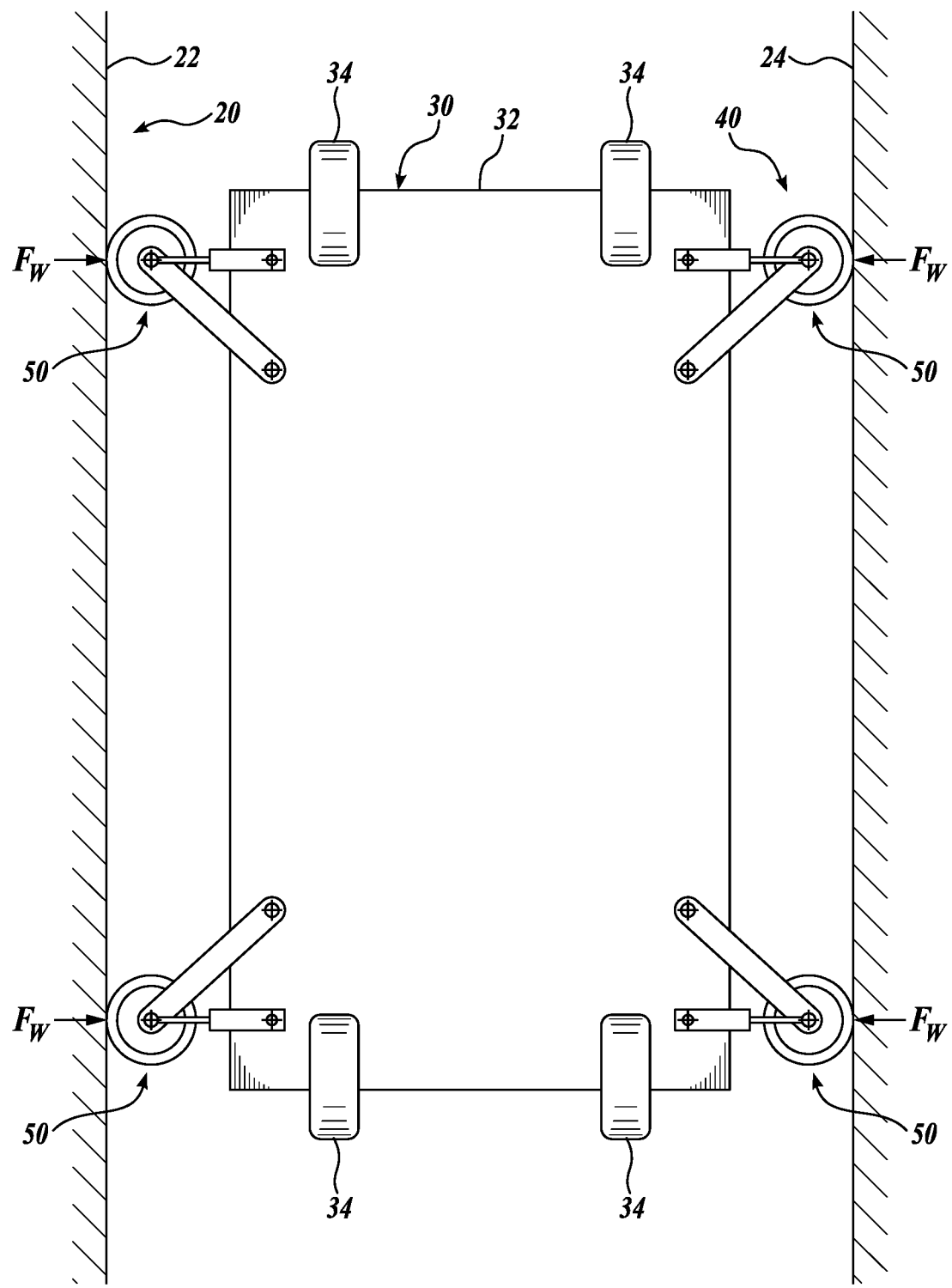
FIG. 1 shows a schematic plan view of a maglev vehicle with a first representative embodiment of a passive lateral stability system having a plurality of guide assemblies according to aspects of the present disclosure, wherein the guide assemblies are in an extended state.
Figure 2:
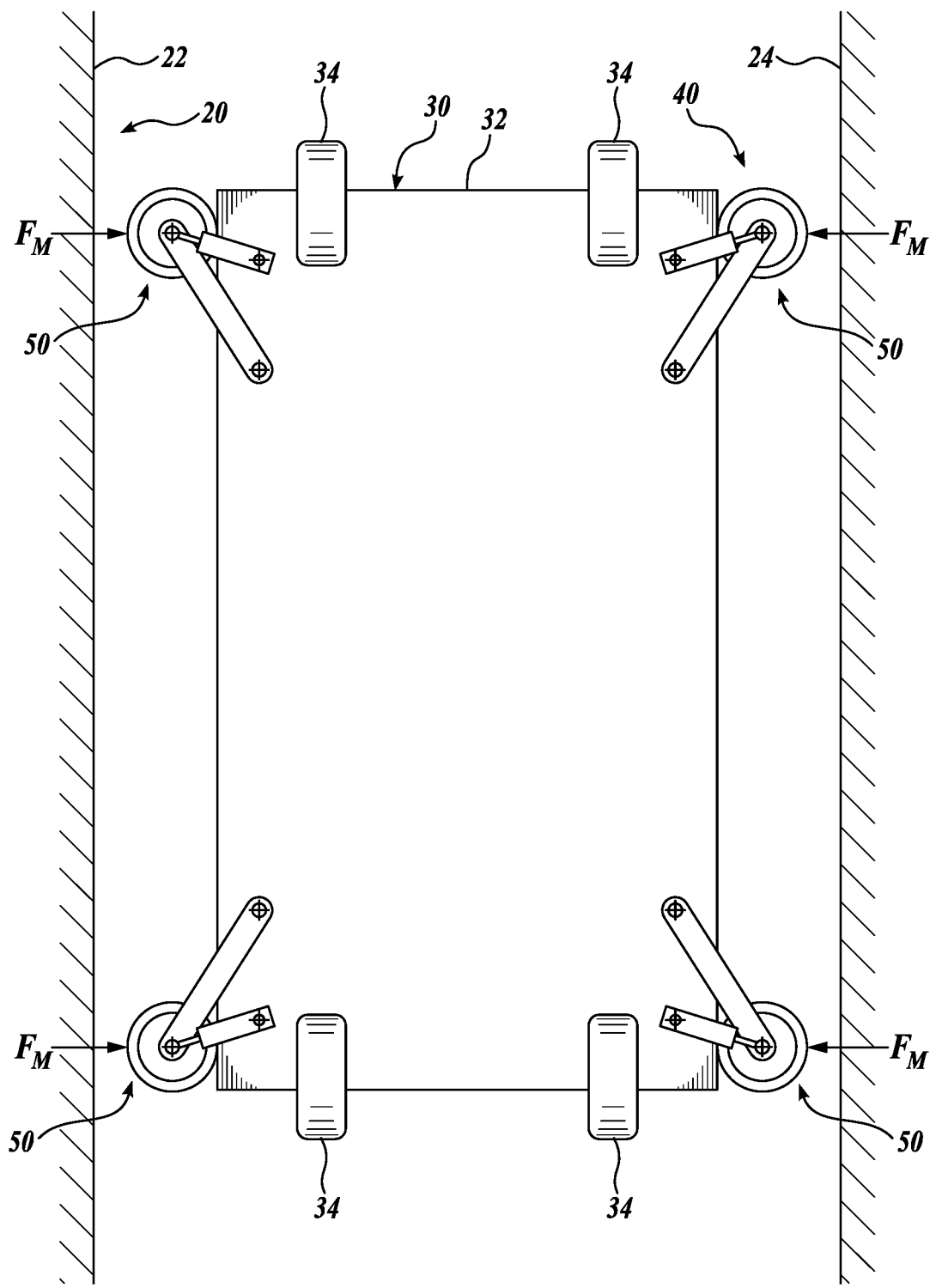
FIG. 2 shows a schematic plan view of the maglev vehicle of FIG. 1, wherein the guide assemblies are in a retracted state.

FIGS. 1 and 2 show a first representative embodiment of a vehicle 30 having a passive lateral stability system 40 according to aspects of the present disclosure. The vehicle 30 includes a body 32 traveling along a guideway 20. A plurality of landing gear assemblies 34 are positioned along the bottom of the vehicle 30. When the vehicle 30 is traveling at low speeds or is stopped, the landing gear assemblies 34 are extended, and the landing gear assemblies support the vehicle. When the vehicle 30 is moving at higher speeds, i.e., when the vehicle is levitated, the landing gear assemblies 34 are retracted and do not support the levitated vehicle.

The guideway 20 includes a first guide wall 22 positioned opposite a second guide wall 24. In the illustrated embodiment, the body 32 of the vehicle 30 is positioned between the first and second guide walls 22 and 24. It will be appreciated that other embodiments are possible in which the only a portion of the vehicle 30 is not located between the first and second guide walls 22 and 24. In an alternate embodiment, a narrow lower portion of the vehicle 30, such as a frame component or a landing gear bogie is positioned between the first and second guide walls 22 and 24, and a wider upper portion of the vehicle extends out laterally above the guide walls.

At least a portion of each of the guide walls 22 and 24 is electrically conductive. In the illustrated embodiment, each of the guide walls 22 and 24 includes one or more electrically conductive materials forming loops along the length of the wall. When these loops, which are used in some known maglev guideways, are exposed to a changing magnetic field, a current is induced in the loop. The induced current, in turn, generates a second magnetic field in the guide wall. In some embodiments, a metallic plate or other suitable form is utilized in place of or in addition to the loops. Such plates or other forms may be formed of aluminium or any other suitable electrical conductor.

In some embodiments, the guide walls are formed from a first material, such as reinforced concrete, and the electrically conductive loops are embedded in the concrete. In some embodiments, the guide walls and the electrically conductive loops are formed from any suitable material to provide sufficient structural capabilities and conductive properties. In this regard, the construction of the guide wall is not limited to any particular configuration, and alternate configurations should be considered within the scope of the present disclosure.

As best shown in FIGS. 1 and 2, a plurality of guide assemblies 50 is mounted to the vehicle 30 proximate to the guide walls 22 and 24. In the illustrated embodiment, two guide assemblies 50 are mounted on each side of the vehicle 30 and are positioned so that each guide assembly on one side of the vehicle corresponds to a similarly positioned guide assembly on the other side of the vehicle. The number and location of guide assemblies 50 is not limited to the illustrated embodiment. In some embodiments, additional guide assemblies are positioned along either or both the sides of the vehicle 30. In some embodiments, each guide assembly does not necessarily correspond to a similarly positioned guide assembly on the opposite side of the vehicle. In some embodiments, guide assemblies on one side of the vehicle are staggered with respect to the guide assemblies on the other side of the vehicle. In some embodiments, guide assemblies are positioned proximate to the forward end of the vehicle 30, while other embodiments include guide assemblies positioned proximate to the aft end of the vehicle. In still other embodiments, such as the embodiment shown in FIGS. 1 and 2, guide assemblies are positioned proximate to both the forward and aft ends of the vehicle.

Figure 3:
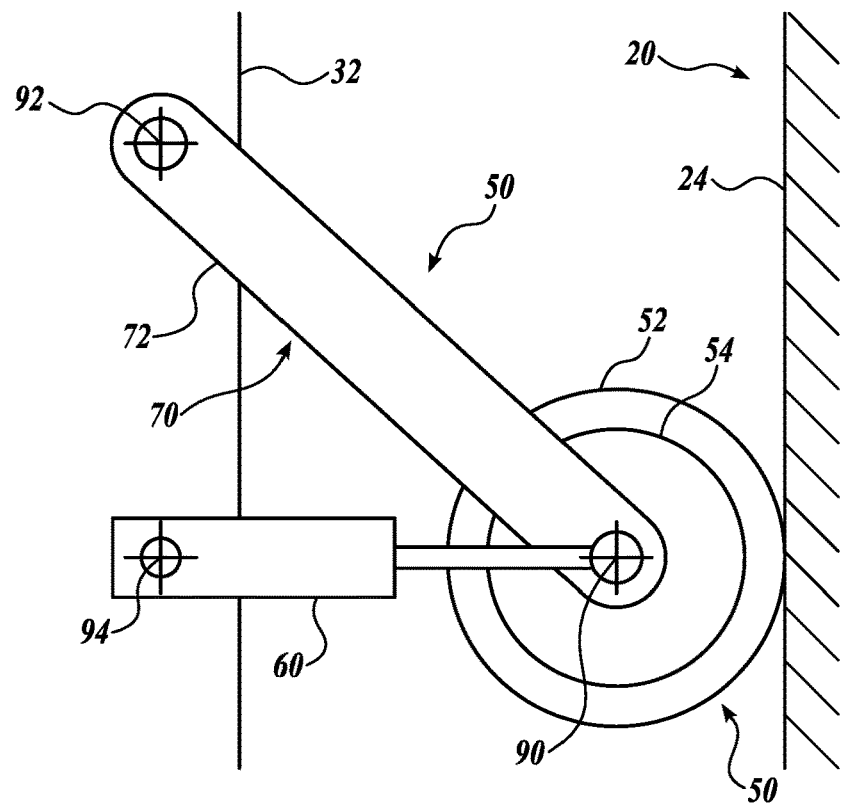
FIG. 3 shows a plan view of one of the guide assemblies shown in FIG. 1.
Figure 4:
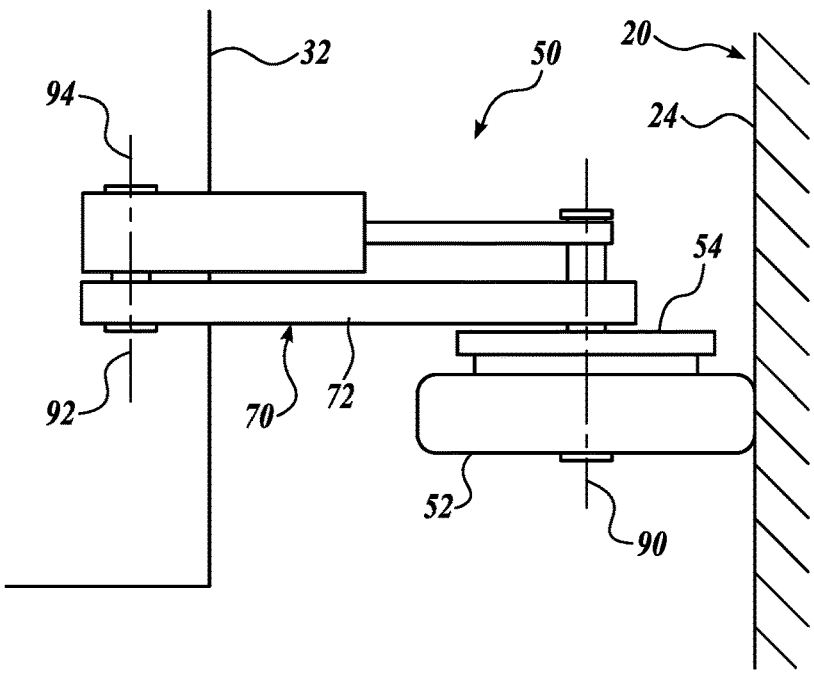
FIG. 4 shows a rear view of the guide assembly shown in FIG. 3.

Referring now to FIGS. 3 and 4, a representative embodiment of a guide assembly 50 suitable of disclosed passive lateral stability system 40 will be described. The illustrated guide assembly 50 will now be described with the understanding that the remaining guide assemblies of the passive lateral stability system 40 shown in FIGS. 1 and 2 are similarly configured. Further, while the described guide assembly 50 corresponds to the second guide wall 24, it will be appreciated that guide assemblies 50 on the other side of the vehicle interact similarly with the first guide wall 22.

The guide assembly 50 includes a wheel 52 that is rotatably coupled to a mount 70 about an axis 90. The mount 70 is configured to allow reciprocating movement of the axis 90 and, therefore, the wheel 52, between an extended position (FIG. 1) and a retracted position (FIG. 2). In the illustrated embodiment, the mount 70 includes an elongate link 72 rotatably coupled to the vehicle body 32 about an axis 92. The wheel 52 is rotatably mounted to a second end of the link 72 about axis 90. When the mount 70 is in the extended position, the wheel 52 rollingly engages the guide wall 24. When the mount 70 is in the retracted position, the second end of the link 72 has rotated away from the guide wall 24 to disengage the wheel 52 from the guide wall.

A biasing element 60 is rotatably coupled at a first end to the vehicle about an axis 94. A second end of the biasing element 60 is rotatably coupled to the mount 70. In the illustrated embodiment, the biasing element 60 is coupled to the mount 70 (link 72) about the axis 90 of rotation of the wheel 52. In other embodiments, the second end of the biasing element 60 is coupled to the link 72 about an axis that is offset from axis 90.

The biasing element 60 acts as a damped compression spring that is preloaded to maintain contact between the wheel 52 and the second guide wall 24 when the vehicle 30 is stopped. In one embodiment, the biasing element is an oleo strut, i.e., an air-oil hydraulic shock absorber, of the type commonly used on known aircraft landing gear. As best shown in FIG. 3, the biasing element 60 pushes wheel 52 towards the second guide wall. The biasing element 60 also damps unwanted oscillations of the wheel 52 to provide smoother, more stable lateral movement.

Alternate configurations of the biasing element 60 are possible. In some embodiments, the biasing element is a combination of one or more undamped springs in combination with one or more discrete dampers. In some embodiments, the spring is a gas spring, a coil spring, a leaf spring, or any other suitable biasing element that urges the wheel 52 toward the guide wall 24. In some embodiments, the biasing element is a linear spring for which the force provided by the spring is proportional to the displacement of the spring. In some embodiments the biasing element is a nonlinear spring.

Referring again to FIGS. 3 and 4, a magnetic element 54 is coupled to the wheel 52. In the illustrated embodiment, the magnetic element 54 is a radial magnetic array that is concentric with the wheel 52. In some embodiments, the magnetic element 54 is a Halbach array extending circumferentially around the axis 90 of the wheel 52. In some embodiments, the magnetic element is a magnetic array coupled to the interior of the wheel 52, the exterior of the wheel, or adjacent to the wheel.

In operation, the passive lateral stability system 40 provides centering forces that maintain the vehicle 30 in a neutral centered position on the guideway 20 across the full range of operating speeds without the need for an external energy supply or external control. The stability system 40 also damps unwanted oscillations from the system to provide a smoother, safer ride.

When the vehicle 30 travels at low speeds, i.e., when the passive magnetic repulsion forces are small, the biasing element 60 forces the wheel 52 into contact with the second guide wall 24. The contact force $F_W$ between the guide wall 24 and the wheel 52 is reacted through the mount 70, i.e., the link, and the biasing element 60 into the vehicle body 32 to urge the body away from the guide wall. As best shown in FIG. 1, the guide assemblies 50 are positioned such that the sum of the forces ($\Sigma F_W$) applied to sides of the vehicle body 32 at low speeds balance to maintain the vehicle body in a neutral, centered position. Because the forces $F_W$ are reacted in part through the damped biasing element 60, unwanted oscillations are reduced or eliminated.

As the magnetic element 54 of each guide assembly 50 moves relative to the corresponding guide wall 22, 24, a current is induced in the electrically conductive portion of the guide wall. As shown in FIG. 2, the induced current generates a magnetic field that repels the magnetic element 54 with a force $F_M$. This repulsion force $F_M$ urges the wheel 52 away from the corresponding guide wall 22, 24.

At low speeds, the magnetic field induced in the conductive guide tracks is relatively small according to Farady's Law of induction and provides little resistance to horizontal displacements. As the speed of the vehicle 30 increases, the magnitude of the generated force $F_M$ increases and compresses the biasing element 60 so that the wheel 52 disengages from the corresponding guide wall 22, 24. The force $F_M$ is reacted through the mount 70, i.e., the link 72, and the compressed biasing element 60 into the vehicle body 32 to urge the body away from the guide wall. As best shown in FIG. 2, the guide assemblies 50 are positioned such that the combined forces ($\Sigma F_M$) applied to sides of the vehicle body 32 at high speeds balance to maintain the vehicle body in a neutral, centered position. The forces $F_M$ are reacted in part through the damped biasing element 60, so that the damping properties of the biasing element reduce or eliminate unwanted oscillations.

Fixing magnetic element 54 to the wheel 52 so that the magnetic element rotates with the wheel also provides spin-up of the wheels due to the magnetic interaction between the conductive guide walls magnetic element. This spin-up reduces abrasive skidding between the wheels 52 and guide walls.

Figure 7:
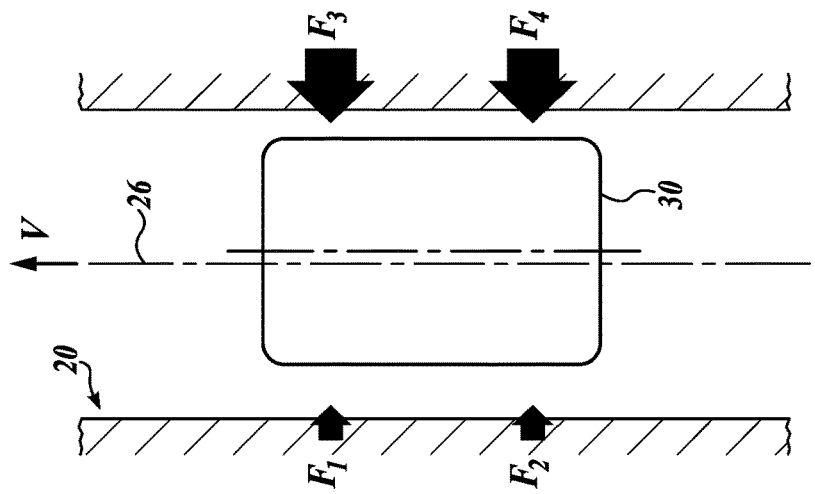
FIG. 7 shows stabilizing forces generated by the lateral stability system of FIG. 1 when the maglev vehicle is offset from a centered position in a second direction.
Figure 6:
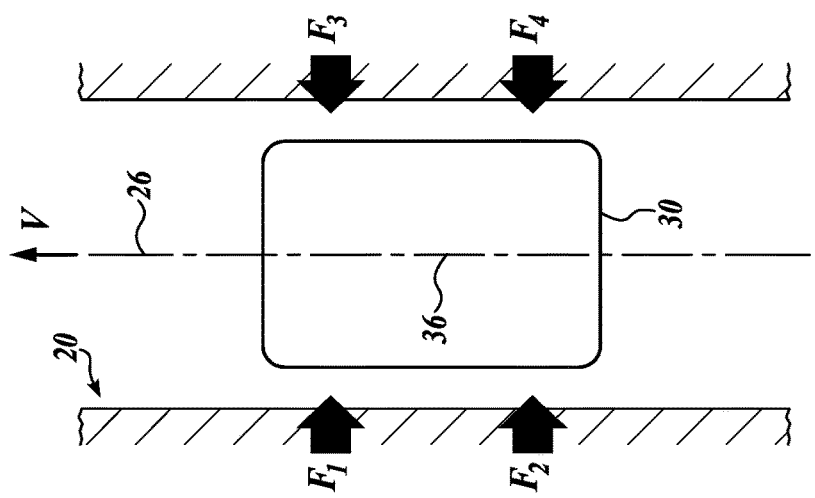
FIG. 6 shows stabilizing forces generated by the lateral stability system of FIG. 1 when the maglev vehicle is in the centered position.
Figure 5:
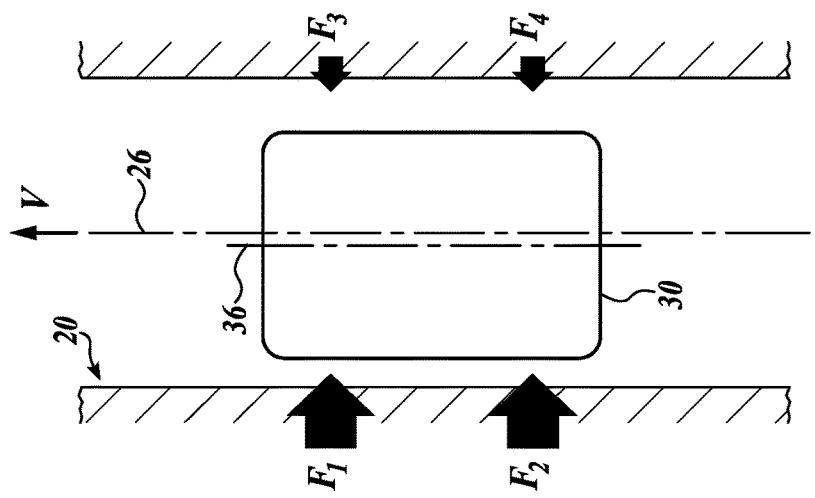
FIG. 5 shows stabilizing forces generated by the lateral stability system of FIG. 1 when the maglev vehicle is offset from a centered position in a first direction.

FIGS. 5-7 illustrate how a representative embodiment of the passive lateral stability system 40 provides variable forces F that cooperate to keep the vehicle 30 centered in the guideway 20. FIG. 6 shows the vehicle 30 positioned in the guideway 20 such that the vehicle centerline 26 is aligned with the guideway centerline 36. When the vehicle 30 is traveling at low speeds, the wheel 52 of each guide assembly 50 is in contact with the corresponding guide wall 22, 24, and the biasing elements 60 of the guide assemblies are equally compressed (See FIG. 3). With the biasing elements 60 equally compressed, the guide assemblies 50 produce equal centering forces F acting on the vehicle 30 to urge the vehicle toward the center of the guideway 20.

If the vehicle 30 is moving at a high speed so that the wheel 52 of each guide assembly 50 has disengaged the corresponding guide wall 22, 24, the centering forces F are provided by the repelling force between the magnetic element 54 of each guide assembly 50 and the magnetic field induced in the corresponding guide wall 22, 24. For similar magnetic elements passing by similar conductive elements guide walls, the repelling force F generated increases with speed and decreases with distance. The magnetic elements 54 are traveling at the same speed and are equally distanced from the corresponding guide walls 22, 24. Accordingly, the repelling forces F produced by the guide assemblies are equal.

Because of the location of the guide assemblies along the vehicle 30, the centering forces applied to the vehicle balance, and the net force applied to the vehicle is 0. That is, forces $F_1$ and $F_2$ applied to the left side of the vehicle 30 in FIG. 6 are equal in magnitude and opposite in direction to forces $F_3$ and $F_4$, respectively, applied to the right side of the vehicle.

Referring to FIG. 5, when the vehicle 30 moves to the left of the center of the guideway 20, the forces $F_1$ and $F_2$ acting on the left side of the vehicle 30 increase, and the forces $F_3$ and $F_4$ acting on the right side of the vehicle decrease so that the net force applied to the vehicle urges the vehicle to the right, i.e., back toward the neutral centered position. When the vehicle 30 is traveling at low speeds with the wheels 52 of the guide assemblies 50 contacting the guide walls 22 and 24, the increase in forces $F_1$ and $F_2$ is due to additional compression of the biasing element 60 of each guide assembly 50 on the left side of the vehicle, and the decrease in forces $F_3$ and $F_4$ is due to reduced compression of the biasing element 60 of each guide assembly 50 on the right side of the vehicle. When the vehicle is traveling at high speeds with the wheels 52 of the guide assemblies 50 disengaged from the guide walls 22 and 24, the increase in forces $F_1$ and $F_2$ is due to the magnetic element 54 of each guide assembly 50 on the left side being closer to the corresponding conductive guide wall, and the decrease in forces $F_3$ and $F_4$ is due to the magnetic element of each guide assembly on the right side being farther from the corresponding conductive guide wall.

As shown in FIG. 7, when the vehicle 30 moves to the right of the center of the guideway 20, the forces $F_1$ and $F_2$ acting on the left side of the vehicle 30 decrease, and the forces $F_3$ and $F_4$ acting on the right side of the vehicle increase so that the net force applied to the vehicle urges the vehicle to the left, i.e., back toward the neutral centered position. The applied forces change for the same reasons described above with respect to FIG. 5, and the changes occur whether the wheels 52 of the guide assemblies 50 are engaged with the guide walls 22, 24 (low speed) or are disengaged with the guide walls (high speed).

Figure 8:
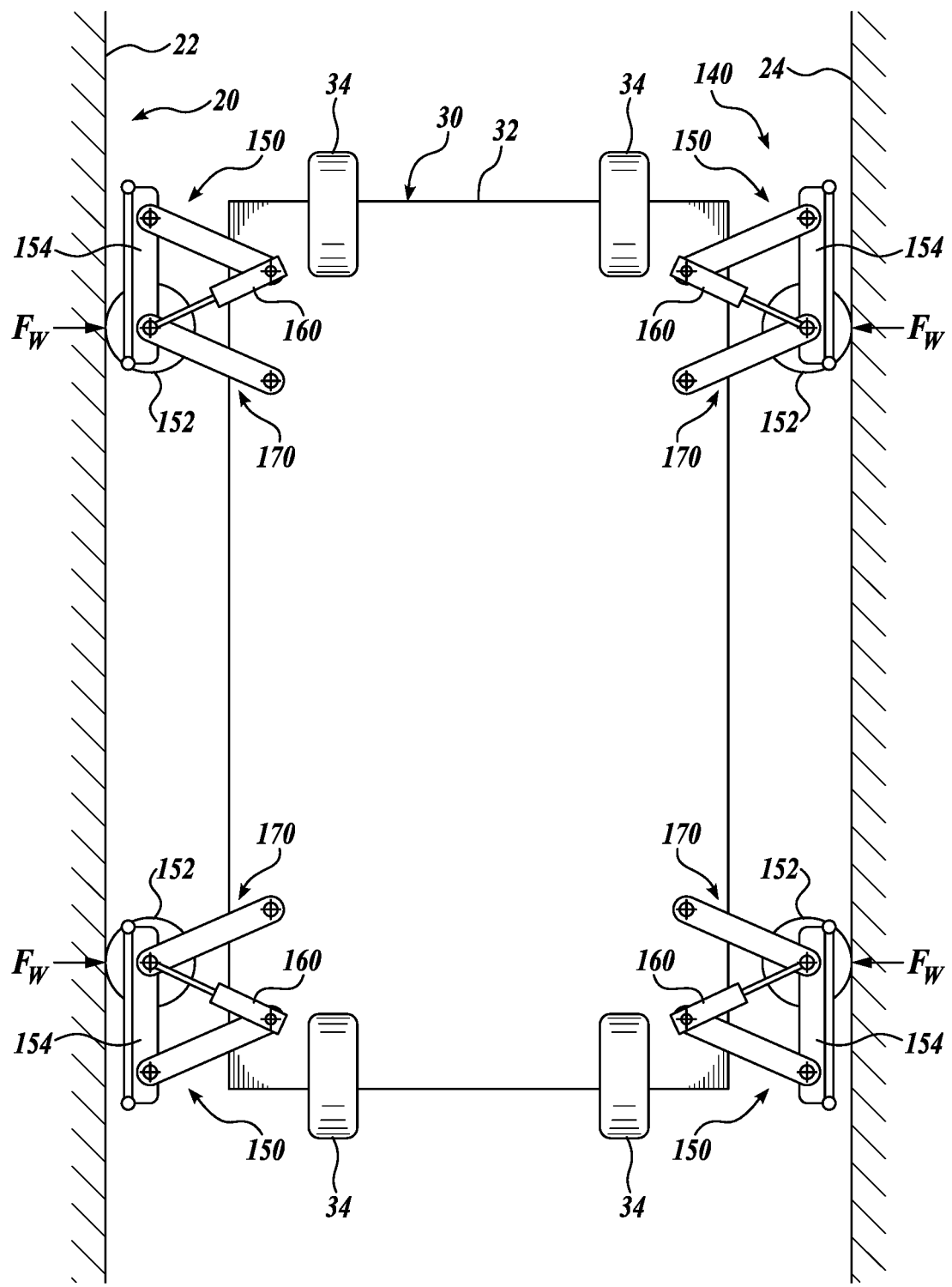
FIG. 8 shows a schematic plan view of the maglev vehicle of FIG. 1 with a second representative embodiment of a passive lateral stability system having a plurality of guide assemblies according to aspects of the present disclosure, wherein the guide assemblies are in an extended state.
Figure 9:
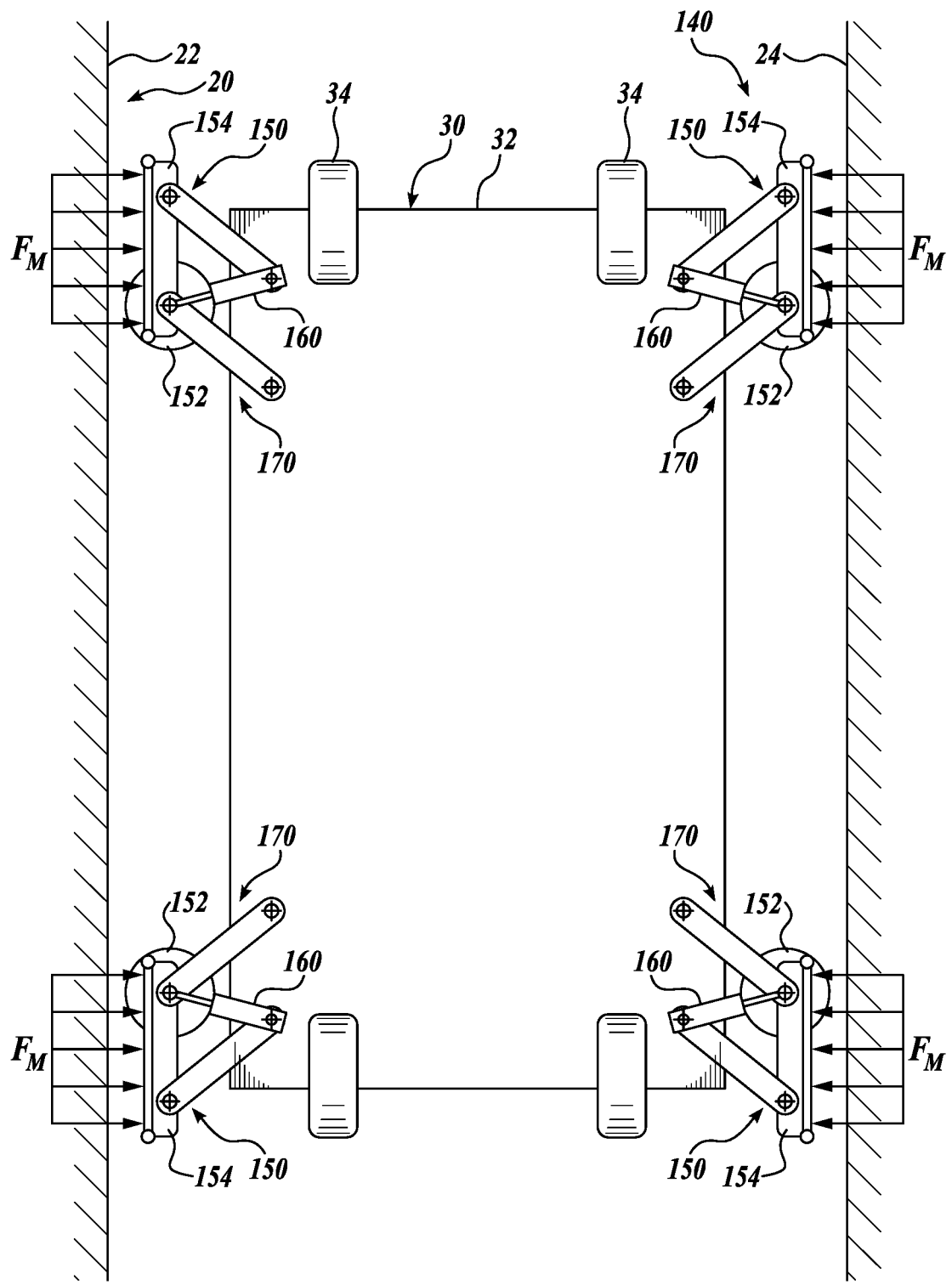
FIG. 9 shows a schematic plan view of the maglev vehicle shown in FIG. 8, wherein the guide assemblies are in a retracted state.
Figure 10:
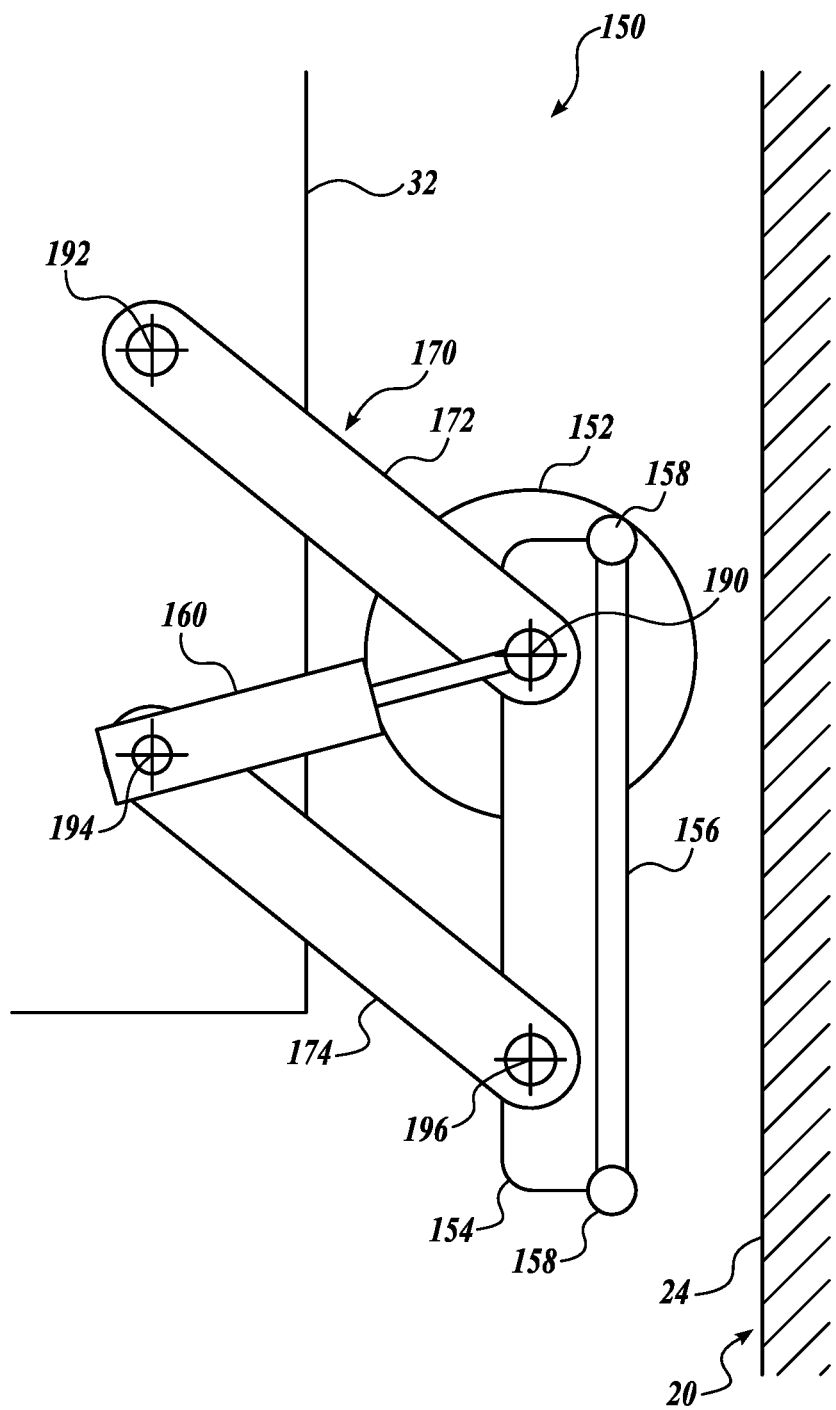
FIG. 10 shows a plan view of one of the guide assemblies shown in FIG. 8.

FIGS. 8-10 show a second representative embodiment of a passive lateral stability system 140 according to aspects of the present disclosure. The lateral stability system 140 includes guide assemblies 150 similar to the previously described guide assemblies 50 shown in FIGS. 1-4, wherein components of the guide assemblies 150 labeled with reference number 1XX correspond to similar components labeled with reference number XX in FIGS. 3 and 4, except as noted. For example, the biasing element 160 shown in FIG. 8-10 is similar to the biasing element 60 shown in FIGS. 3 and 4 unless otherwise described.

As best shown in FIG. 10, the guide assembly 150 is similar to the previously described guide assembly except that the (1) magnetic element 154 is an elongate bar rather than a radial magnetic array, and (2) the mount 170 is a four-bar linkage in which the magnetic element 154 forms at least part of one of the links.

The mount 170 includes a first link 172 rotatably coupled at a first end to the vehicle 30 about and axis 192. A second link 174 is rotatably coupled at a first end to the vehicle 30 about an axis 194. The first link 172 and the second link 174 are rotatably coupled to first and second ends, respectively, of the elongate magnetic element 154 about axes 190 and 196, respectively. The resulting four-bar linkage is configured so that the elongate magnetic element 154 remains generally parallel to the corresponding guide wall as the guide assembly 150 reciprocates between the extended position (FIG. 8) and retracted position (FIG. 9).

Still referring to FIG. 10, the biasing element 160 is rotatably coupled at one end to the vehicle 30 about axis 194 and at the other end to the elongate magnetic element 154 about axis 190. The wheel 152 is rotatably coupled to the mount 170 about axis 190. It will be appreciated that the particular geometry of the disclosed guide assembly 150 is exemplary only and should not be considered limiting. In some embodiments, one or both ends of the biasing element 160 are coupled to different portions of the vehicle 30/mount 170. In some embodiments, the wheel 152 is mounted to a different portion of the elongate magnetic element 154 or to a different portion of one of the links 172, 174 that form the mount 170. These and other variations are possible and should be considered within the scope of the present disclosure.

In some embodiments, an optional wear strip 156 is mounted to a side of the elongate magnetic element 154 proximate to the corresponding guide wall. In some embodiments, one or more rollers 158 are mounted to the elongate magnetic element 154 proximate to the corresponding guide wall. In the event of a wheel 152 failure, such as a tire deflation, the wear strip 156 and/or rollers 158 will protect the magnetic element 154 by preventing contact between the magnetic element and the guide wall.

When the vehicle 30 is traveling at low speeds, as shown in FIG. 8, the guide assemblies 150 are extended, and each wheel 152 is in contact with its corresponding guide wall. The guide walls 22 and 24 apply centering forces $F_W$ to the wheels 152, which react those forces through the biasing elements 160 and the mounts 170 to keep the vehicle 30 centered in the guideway 10 in a manner similar to that of the guide assemblies 150 shown in FIGS. 1-4.

When the vehicle 30 is traveling at high speeds, as shown in FIG. 9, the guide assemblies 150 are retracted under the force of the magnetic centering loads $F_M$. In this regard, movement of each elongate magnetic element 154 relative to the corresponding guide wall generates a repelling force that acts as a distributed load $F_M$ across the length of the elongate magnetic element. These loads $F_M$ are reacted through the biasing elements 160 and the mounts 170 to keep the vehicle 30 centered in the guideway 10 in a manner similar to that of the guide assemblies 150 shown in FIGS. 1-4.

Figure 11:
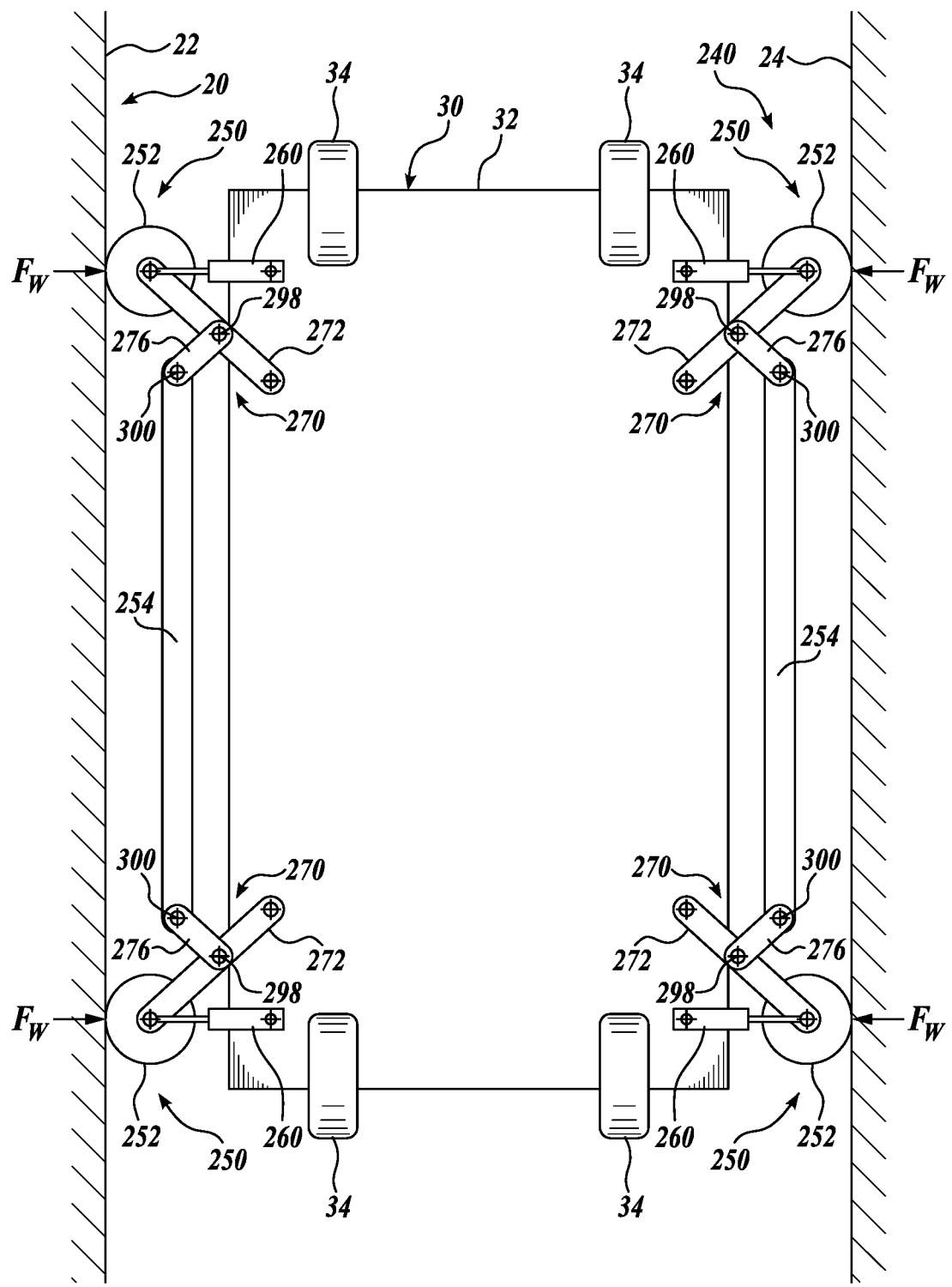
FIG. 11 shows a schematic plan view of the maglev vehicle of FIG. 1 with a third representative embodiment of a passive lateral stability system having a plurality of guide assemblies according to aspects of the present disclosure, wherein the guide assemblies are in an extended state.
Figure 12:
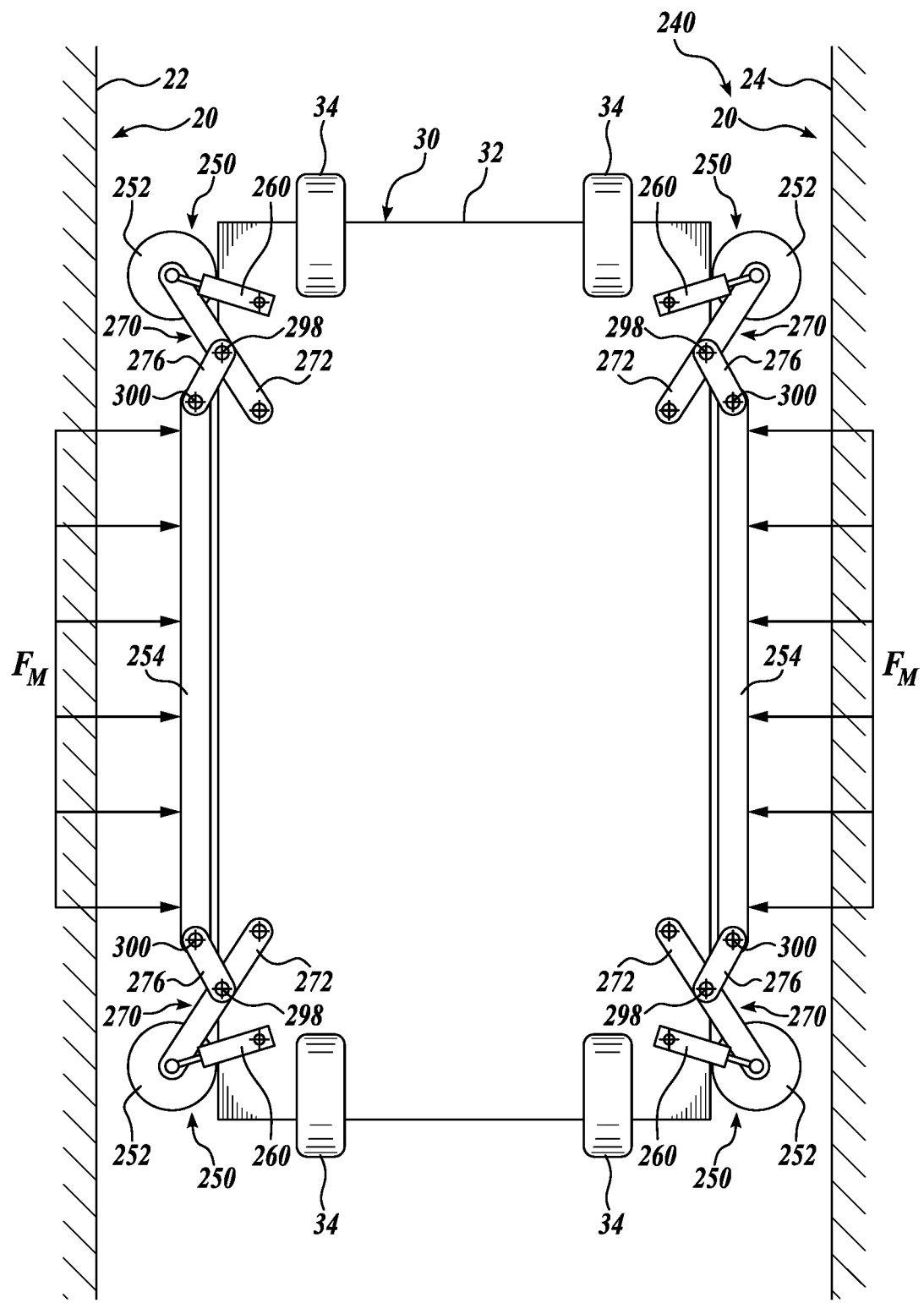
FIG. 12 shows a schematic plan view of the maglev vehicle shown in FIG. 11, wherein the guide assemblies are in a retracted state.

FIGS. 11 and 12 show a third representative embodiment of a passive lateral stability system 240 according to aspects of the present disclosure. The lateral stability system 240 includes guide assemblies 250 similar to the previously described guide assemblies 50 shown in FIGS. 1-4, wherein components of the guide assemblies 250 labeled with reference number 2XX correspond to similar components labeled with reference number XX in FIGS. 3 and 4, except as noted. For example, the biasing element 260 shown in FIGS. 11 and 12 is similar to the biasing element 60 shown in FIGS. 3 and 4 unless otherwise described.

As shown in FIG. 11, the mount 270 of the illustrated guide assembly 250 is configured and functions similar to the mount 70 of the guide assembly 50 shown in FIGS. 1-4. In particular, when the vehicle 30 is traveling at low speeds and the wheels 252 are engaged with the corresponding guide walls, the guide assemblies 250 provide centering forces $F_W$ in the same manner as the previously described guide assemblies 50. For the sake of brevity, low-speed function of the guide assemblies 250 of FIGS. 11 and 12 will not be described, with the understanding that this functionality can be understood with reference to the previous description of the guide assembly 50 of FIGS. 1-4.

The passive lateral stability system 240 differs from the system 40 shown in FIGS. 1-4 in that rather than (or in addition to) each guide assembly 50 having its own magnetic element 54, an elongate magnetic element 254 extends between adjacent guide assemblies 250. The elongate magnetic element 254 is supported at each end by a link 276. Each link 276 is rotatably coupled to the elongate magnetic element 254 about an axis 300 and to the associated guide assembly 250 about an axis 298. In the illustrated embodiment, the link 276 is shown coupled to the link 272 of the mount 270; however, it will be appreciated that the link (or the elongate magnetic element 254) may be coupled to any suitable portion of the guide assemblies 250 using various links or combinations of links or other suitable configurations, and such embodiments should be considered within the scope of the present disclosure.

When the vehicle 30 is traveling at high speeds, as shown in FIG. 12, the guide assemblies 250 are retracted under the force of the magnetic centering loads $F_M$. In this regard, movement of each elongate magnetic element 254 relative to the corresponding guide wall generates a repelling force that acts as a distributed load $F_M$ across the length of the elongate magnetic element. These loads $F_M$ are reacted through the biasing elements 160 and the mounts 170 of the adjacent guide assemblies 250 to keep the vehicle 30 centered in the guideway 10 in a manner similar to that of the guide assemblies 50 shown in FIGS. 1-4.

Figure 14:
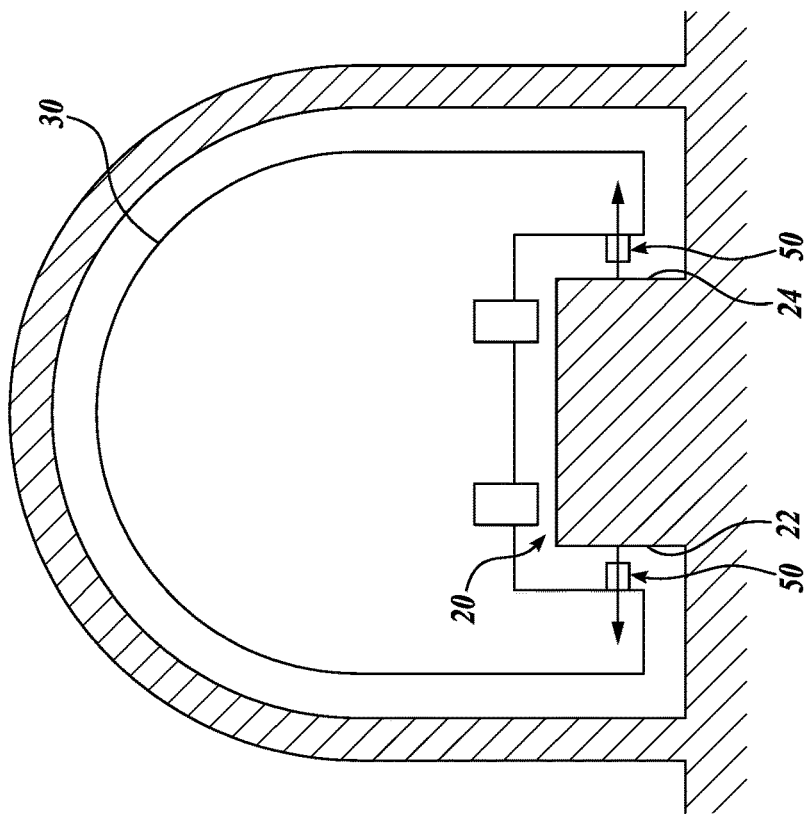
FIG. 14 shows an end view of the maglev vehicle of FIG. 13 with an alternate embodiment of the disclosed passive lateral stability system.
Figure 13:
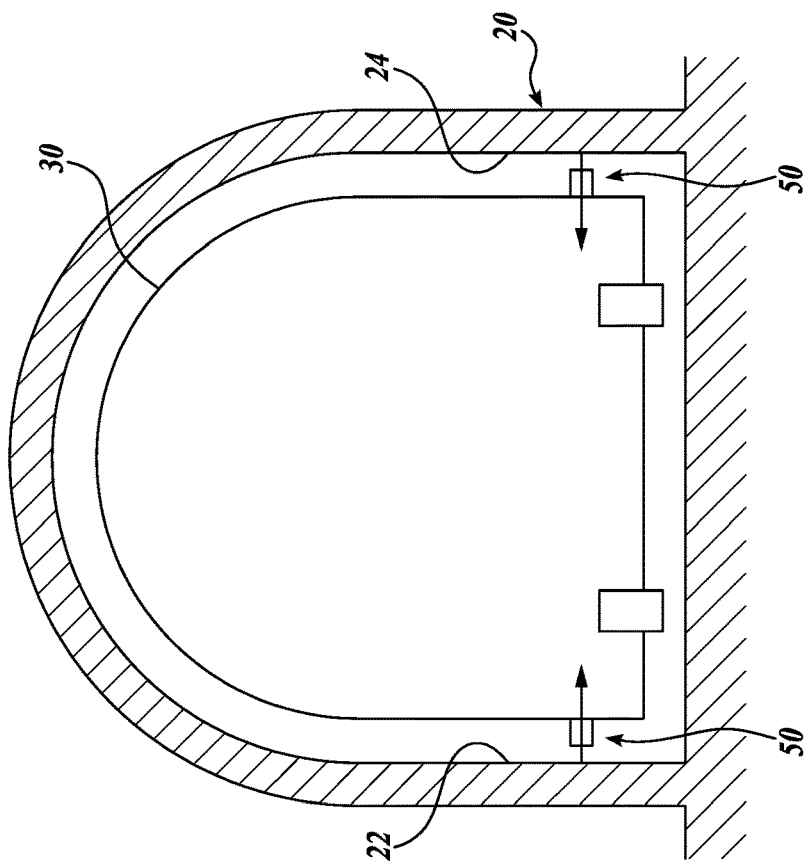
FIG. 13 shows an end view of the maglev vehicle of FIG. 1.

FIG. 13 shows an end view of a vehicle 30 in which the guide assemblies 50 are positioned between the guide walls and generate forces that act toward the centerline of the vehicle to provide lateral stability. FIG. 14 shows an alternative embodiment in which the guide walls 22 and 24 are positioned between the guide assemblies 50 to generate an outward force, i.e., away from the vehicle 30 centerline to provide lateral stability. It will be appreciated that the various guide assemblies within the scope of the present disclosure can be provided with either of the embodiments shown in FIGS. 13 and 14.

It will be appreciated that the disclosed embodiments are exemplary only, and numerous variations to the disclosed embodiments are possible. In some embodiments, the number and position of the guide assemblies can vary. In some embodiments, multiple guide assemblies can be stacked vertically. In some embodiments, the strength of the stabilization forces of the system are tailored for different use cases by varying features of the system such as magnetic strength of the magnet elements, the motion of the mounts, and strength of spring force and/or damping capabilities of the biasing element. These and other suitable variations are contemplated and should be considered within the scope of the present disclosure.

The detailed description set forth above in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed.

In the foregoing description, specific details are set forth to provide a thorough understanding of exemplary embodiments of the present disclosure. It will be apparent to one skilled in the art, however, that the embodiments disclosed herein may be practiced without embodying all of the specific details. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also, in this regard, the present application may use the term "plurality" to reference a quantity or number. In this regard, the term "plurality" is meant to be any number that is more than one, for example, two, three, four, five, etc. The term "about," "approximately," etc., means plus or minus 5% of the stated value.

For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. A passive lateral stability system for maintaining a position of a vehicle relative to first and second electrically conductive guide walls, the system comprising:
   a first guide assembly mounted to the vehicle and urging the vehicle away from the first guide wall, the first guide assembly comprising:
   a first wheel;
   a first mount coupled to the vehicle, the first wheel being rotatably coupled to the first mount about a first axis, the first mount being configured to reciprocate the first wheel toward the first guide wall and away from the first guide wall;
   a first biasing element configured to bias the first wheel toward the first guide wall; and
   a first magnetic element associated with the first wheel, wherein movement of the first magnetic element relative to the first guide wall produces a force that biases the first wheel away from the first guide wall; and
   a second guide assembly mounted to the vehicle and urging the vehicle away from the second guide wall.

2. The system of claim 1, wherein the second guide assembly comprises:
   a second wheel;
   a second mount coupled to the vehicle, the second wheel being rotatably coupled to the second mount about a second axis, the second mount being configured to reciprocate the second wheel toward the second guide wall and away from the second guide wall;
   a second biasing element configured to bias the second wheel toward the second guide wall; and
   a second magnetic element associated with the second wheel, wherein movement of the second magnetic element relative to the second guide wall produces a force that biases the second wheel away from the second guide wall.

3. The system of claim 1, wherein the first mount comprises a link rotatably coupled at a first end to the vehicle, the first wheel being rotatably mounted to a second end of the link.

4. The system of claim 3, wherein a first end of the first biasing element is rotatably coupled to the vehicle, a second end of the first biasing element being rotatably coupled to the link.

5. The system of claim 1, wherein the first biasing element is an oleo-pneumatic strut rotatably coupled at a first end to the vehicle coupled at a first end to the vehicle and at a second end to the first mount.

6. The system of claim 1, wherein the first magnetic element comprises a magnetic array coupled to the first wheel.

7. The system of claim 6, wherein the magnetic array comprises a radial magnetic array extending around the first axis.

8. The system of claim 1, wherein the first mount comprises a four-bar linkage, comprising:
   a first link rotatably coupled at a first end to the vehicle;
   a second link rotatably coupled at a first end to the vehicle; and
   a third link rotatably coupled at a first end to the first link and at a second end to the second link.

9. The system of claim 8, wherein the first magnetic element forms at least a part of the third link.

10. The system of claim 9, wherein the first magnetic element comprises a linear Halbach array.

11. The system of claim 10, wherein the third link remains parallel to the first guide wall as the first wheel reciprocates toward the first guide wall and away from the first guide wall.

12. The system of claim 1, the first guide assembly further comprising:
   a second wheel;
   a second mount coupled to the vehicle, the second wheel being rotatably coupled to the second mount about a second axis, the second mount being configured to reciprocate the second wheel toward the first guide wall and away from the first guide wall;
   a second biasing element configured to bias the second wheel toward the first guide wall,
   wherein the first magnetic element is coupled to the first mount and the second mount.

13. The system of claim 12, wherein the first magnetic element is an elongate element, a first end of the elongate element being coupled to the first mount by a first attachment link, a second end of the elongate element being coupled to the second mount be a second attachment link.

14. The system of claim 10, wherein the first magnetic element comprises a linear Halbach array.

* * * * *